United States Patent
Grooms et al.

(10) Patent No.: US 10,443,854 B2
(45) Date of Patent: Oct. 15, 2019

(54) PILOT PREMIX NOZZLE AND FUEL NOZZLE ASSEMBLY

(71) Applicant: General Electric Company, Schenectady, NY (US)

(72) Inventors: Neal William Grooms, Simpsonville, SC (US); James Harper, Greenville, SC (US); Yon Han Chong, Greer, SC (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 15/188,163

(22) Filed: Jun. 21, 2016

(65) Prior Publication Data

US 2017/0363293 A1    Dec. 21, 2017

(51) Int. Cl.
*F23R 3/28* (2006.01)
*F23R 3/34* (2006.01)
*F02C 7/22* (2006.01)

(52) U.S. Cl.
CPC .............. *F23R 3/286* (2013.01); *F02C 7/222* (2013.01); *F23R 3/343* (2013.01); *F05D 2220/32* (2013.01); *F23R 2900/03343* (2013.01)

(58) Field of Classification Search
CPC .......... F23R 3/343; F23R 3/286; F23R 3/002; F23R 3/04; F23R 3/06; F23R 3/10; F23R 3/34; F23R 3/346; F23R 3/36; F23R 3/32
USPC .................. 60/737, 738, 740, 742, 746, 747
See application file for complete search history.

(56) References Cited

U.S. PATENT DOCUMENTS

| 6,446,439 | B1 |  | 9/2002 | Kraft et al. | |
|---|---|---|---|---|---|
| 7,748,221 | B2 | * | 7/2010 | Patel | F23R 3/10 60/752 |
| 8,281,595 | B2 | * | 10/2012 | Davis, Jr. | F23D 14/82 60/737 |
| 8,312,722 | B2 | * | 11/2012 | York | F23D 14/62 239/132.3 |
| 8,464,537 | B2 | * | 6/2013 | Khan | F23R 3/286 60/737 |

(Continued)

OTHER PUBLICATIONS

Extended European Search Report and Opinion issued in connection with corresponding EP Application No. 17176815.3 dated Mar. 16, 2018.

(Continued)

*Primary Examiner* — Todd E Manahan
*Assistant Examiner* — Alyson Joan Harrington
(74) *Attorney, Agent, or Firm* — Dority & Manning, P.A.

(57) ABSTRACT

A premix pilot nozzle is disclosed herein. The premix pilot nozzle includes a nozzle body. The nozzle body includes a forward wall, an aft wall, an outer band that extends between the forward wall and the aft wall and a tip portion that extends axially downstream from the aft wall. The nozzle body further defines a fuel inlet plenum that extends coaxially within the nozzle body, a fuel distribution plenum that is defined within the nozzle body radially outwardly from and in fluid communication with the fuel inlet plenum, a plurality of premix passages that extend helically around the fuel inlet plenum within the fuel distribution plenum and a plurality of air passages annularly arranged around the plurality of premix passages. One or more premix passages of the plurality of premix passages are in fluid communication with the fuel distribution plenum.

20 Claims, 6 Drawing Sheets

(56) References Cited

U.S. PATENT DOCUMENTS

| | | |
|---|---|---|
| 8,468,831 B2 | 6/2013 | Venkataraman et al. |
| 8,677,760 B2 | 3/2014 | Khan et al. |
| 8,919,673 B2 | 12/2014 | Subramanian et al. |
| 9,297,535 B2 | 3/2016 | Uhm et al. |
| 2004/0079082 A1* | 4/2004 | Bunker .................. F23M 5/00 60/752 |
| 2006/0059915 A1 | 3/2006 | Furletov et al. |
| 2009/0199561 A1* | 8/2009 | Hessler ................ F23D 11/24 60/734 |
| 2009/0293482 A1* | 12/2009 | Davis, Jr. ............. F23D 14/82 60/737 |
| 2010/0095677 A1* | 4/2010 | Dawson ................ F23D 14/76 60/752 |
| 2010/0101229 A1* | 4/2010 | York .................... F23D 14/62 60/737 |
| 2011/0057056 A1 | 3/2011 | Ziminsky et al. |
| 2012/0096866 A1* | 4/2012 | Khan .................... F23R 3/286 60/737 |
| 2013/0219899 A1* | 8/2013 | Uhm ..................... F23R 3/14 60/738 |
| 2013/0283805 A1* | 10/2013 | Zuo ...................... F23R 3/14 60/748 |
| 2015/0159875 A1 | 6/2015 | Berry et al. |
| 2015/0253011 A1 | 9/2015 | Uhm et al. |
| 2016/0010855 A1* | 1/2016 | Myers ................... F23D 11/24 239/403 |
| 2016/0186662 A1* | 6/2016 | Stewart ................. F23R 3/14 239/403 |
| 2016/0313006 A1* | 10/2016 | Stewart ................. F23R 3/286 |
| 2017/0089581 A1* | 3/2017 | Lao ...................... F23R 3/06 |
| 2017/0130653 A1* | 5/2017 | Bennett ................ F02C 7/264 |

OTHER PUBLICATIONS

U.S. Appl. No. 14/585,787, filed Dec. 30, 2014.
U.S. Appl. No. 14/585,811, filed Dec. 30, 2014.
U.S. Appl. No. 14/585,837, filed Dec. 30, 2014.
U.S. Appl. No. 14/691,864, filed Apr. 21, 2015.

* cited by examiner

PILOT PREMIX NOZZLE AND FUEL NOZZLE ASSEMBLY

FIELD OF THE INVENTION

The present invention generally involves a fuel nozzle assembly for a gas turbine combustor. More specifically, the invention relates to a pilot premix nozzle for a fuel nozzle assembly.

BACKGROUND OF THE INVENTION

As requirements for gas turbine emissions have become more stringent, one approach to meeting such requirements is to move from diffusion flame combustors to combustors utilizing lean fuel and air mixtures using a fully premixed operations mode to reduce emissions of, for example, NOx and CO. These combustors are generally known in the art as Dry Low NOx (DLN), Dry Low Emissions (DLE) or Lean Pre Mixed (LPM) combustion systems.

Certain DLN type combustors include a plurality of primary fuel nozzles which are annularly arranged about a secondary or center fuel nozzle. The fuel nozzles are circumferentially surrounded by an annular combustion liner. The combustion liner defines an upstream combustion chamber and a downstream combustion chamber of the combustor. The upstream combustion chamber and the downstream combustion chamber may be separated by a throat portion of the combustion liner.

During operation of the combustor, the primary fuel nozzles may provide fuel to the upstream combustion chamber. Depending on the operational mode, the fuel from the primary fuel nozzles may be burned in the upstream combustion chamber or may be premixed with compressed air within the upstream combustion chamber for ignition in the downstream combustion chamber. The secondary fuel nozzle serves several functions in the combustor including supplying fuel and air mixture to the downstream combustion chamber for premixed mode operation, supplying fuel and air for a pilot flame supporting primary nozzle operation and providing transfer fuel for utilization during changes between operation modes.

In certain combustors, the secondary fuel nozzle may include a diffusion pilot nozzle disposed at a downstream end of the secondary fuel nozzle. The diffusion pilot nozzle provides a stream of fuel and air to the second combustion chamber and is employed for anchoring a secondary flame. However, in order to comply with various emissions requirements the fuel flow to the pilot fuel circuit may be reduced. As a result, the reduced fuel flow to the pilot fuel circuit may impact combustion dynamics and/or lean blow out limits.

BRIEF DESCRIPTION OF THE INVENTION

Aspects and advantages of the invention are set forth below in the following description, or may be obvious from the description, or may be learned through practice of the invention.

One embodiment of the present invention is a pilot premix nozzle. The pilot premix nozzle includes a nozzle body. The nozzle body includes a forward wall that is axially spaced from an aft wall, an outer band that extends between the forward wall and the aft wall and a tip portion that extends axially downstream from the aft wall and that terminates at a downstream wall. The nozzle body further includes a fuel inlet plenum that extends coaxially within the nozzle body and that is partially defined by an inner surface of the downstream wall, a fuel distribution plenum which is defined within the nozzle body radially outwardly from and in fluid communication with the fuel inlet plenum and a plurality of premix passages that extend helically around the fuel inlet plenum within the fuel distribution plenum. The premix pilot nozzle further includes a plurality of air passages annularly arranged around the plurality of premix passages. One or more premix passages of the plurality of premix passages are in fluid communication with the fuel distribution plenum.

Another embodiment of the present disclosure is a fuel nozzle assembly. The fuel nozzle assembly includes an outer tube having an upstream end that is axially spaced from a downstream end. An inner tube extends axially within the outer tube and is radially spaced from the outer tube so as to define an annular air passage therebetween. The fuel nozzle assembly further includes a premix pilot nozzle that is coupled to the downstream end of the outer tube. The premix pilot nozzle comprises a nozzle body. The nozzle body includes a forward wall that is axially spaced from an aft wall with respect to an axial centerline of the nozzle body, an outer band that is coupled to the downstream end of the outer tube and that extends axially between the forward wall and the aft wall. The nozzle body further includes a tip portion that extends axially downstream from the aft wall. The tip portion includes a downstream wall. The nozzle body further includes a fuel tube which defines a fuel inlet plenum that extends coaxially within the nozzle body and that is partially defined by an inner surface of the downstream wall. The fuel inlet plenum is in fluid communication with the inner tube. The nozzle body also defines a fuel distribution plenum defined within the nozzle body radially outwardly from and in fluid communication with the fuel inlet plenum and a plurality of premix passages that extend helically around the fuel inlet plenum within the fuel distribution plenum. The premix pilot nozzle further includes a plurality of air passages annularly arranged around the plurality of premix passages. Each premix passage of the plurality of premix passages is in fluid communication with the fuel distribution plenum.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a fuel nozzle assembly for a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Figure 1:
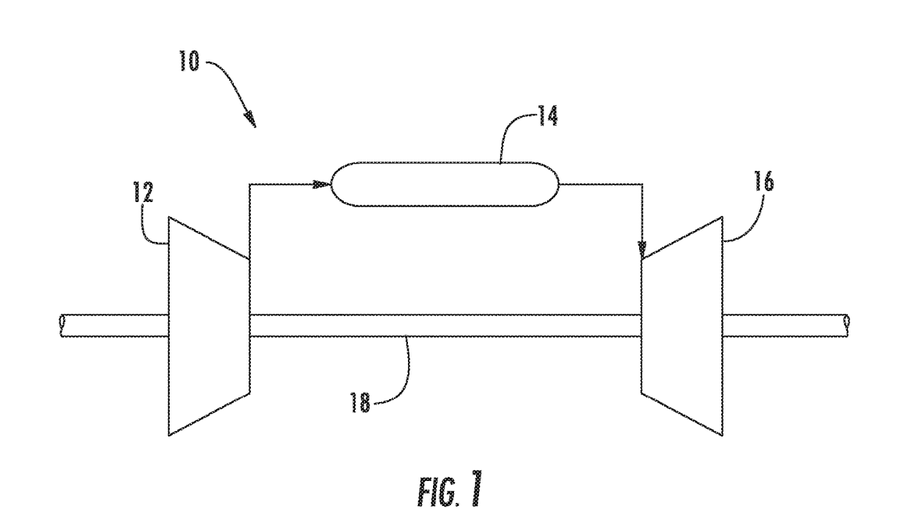
FIG. 1 illustrates a schematic depiction of an embodiment of a gas turbine.

Referring to the drawings, FIG. 1 illustrates a schematic depiction of an embodiment of a gas turbine 10. The gas turbine 10 includes a compressor section 12, a combustion section 14, and a turbine section 16. The compressor section 12 and turbine section 16 may be coupled by a shaft 18. The shaft 18 may be a single shaft or a plurality of shaft segments coupled together to form the shaft 18. During operation, the compressor section 12 supplies compressed air to the combustion section 14. The compressed air is mixed with fuel and burned within the combustion section 14 to produce hot gases of combustion which flow from the combustion section 14 to the turbine section 16, wherein energy is extracted from the hot gases to produce work.

Figure 2:
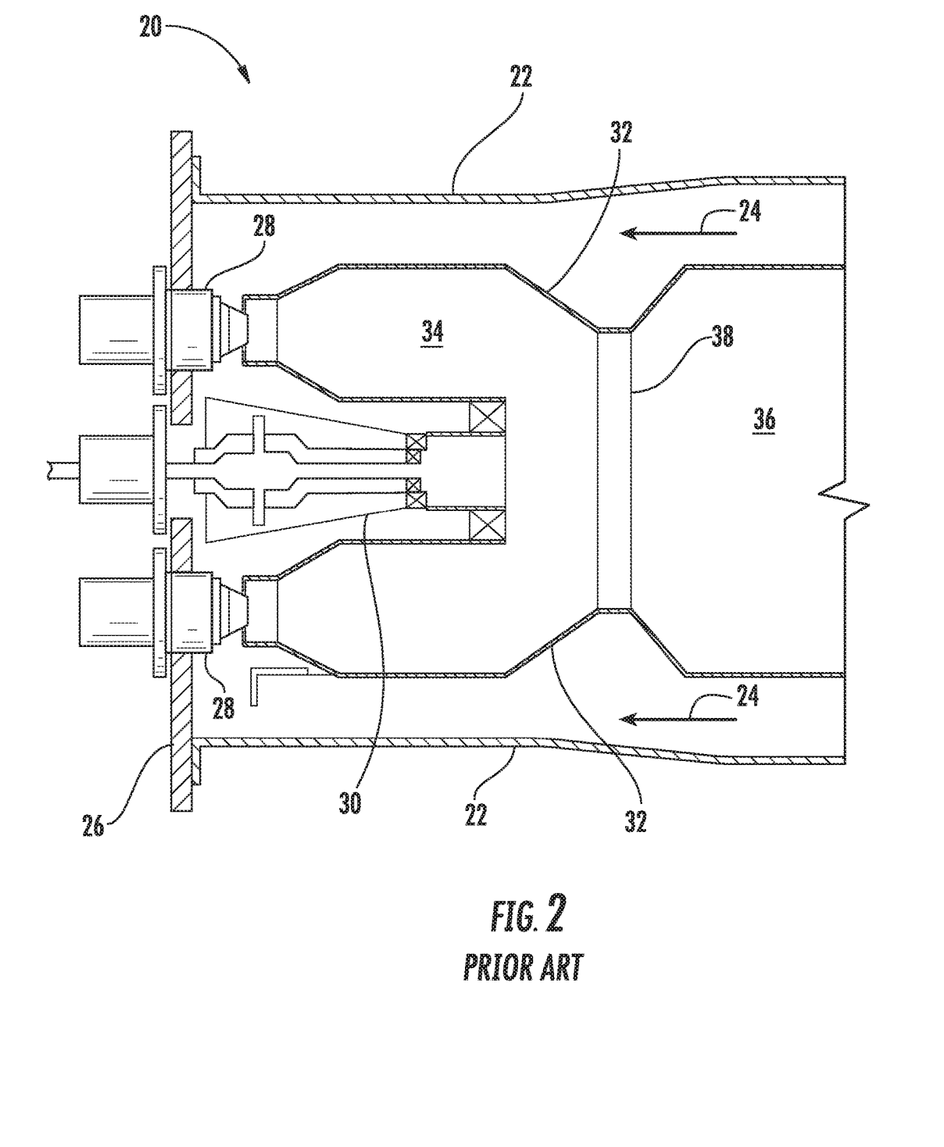
FIG. 2 illustrates a simplified cross-section of an exemplary combustor known in the art and which may incorporate one or more embodiments of the present disclosure.

The combustion section 14 may include a plurality of combustors 20 (one of which is illustrated in FIG. 2) positioned in an annular array about a center axis of the gas turbine 10. FIG. 2 provides a simplified cross-section of an exemplary combustor 20 known in the art and which may incorporate one or more embodiments of the present disclosure. As shown in FIG. 2, a casing 22 surrounds the combustor 20 to contain compressed air 24 flowing from the compressor section 12 (FIG. 1). Multiple fuel nozzles are arranged across an end cover 26. For example, in particular embodiments, a plurality of primary fuel nozzles 28 is circumferentially spaced radially outwardly from a secondary fuel nozzle 30. A liner 32 extends downstream from the fuel nozzles 28, 30 and defines an upstream or forward combustion chamber 34 and a downstream or aft combustion chamber 36 which are separated by a throat or converging/diverging portion 38 of the liner 32.

During operation of the combustor 20, the primary fuel nozzles 28 may provide fuel to the upstream combustion chamber 34. Depending on the operational mode of the combustor 20, the fuel from the primary fuel nozzles 28 may be burned in the upstream combustion chamber 34 or may be premixed with the compressed air 24 within the upstream combustion chamber 34 for ignition in the downstream combustion chamber 36. The secondary fuel nozzle 30 serves several functions in the combustor 20 including supplying a fuel and air mixture to the downstream combustion chamber 36 for premixed mode operation, supplying fuel and air for a pilot flame which supports primary nozzle operation and providing transfer fuel for utilization during changes between operation modes.

Figure 3:
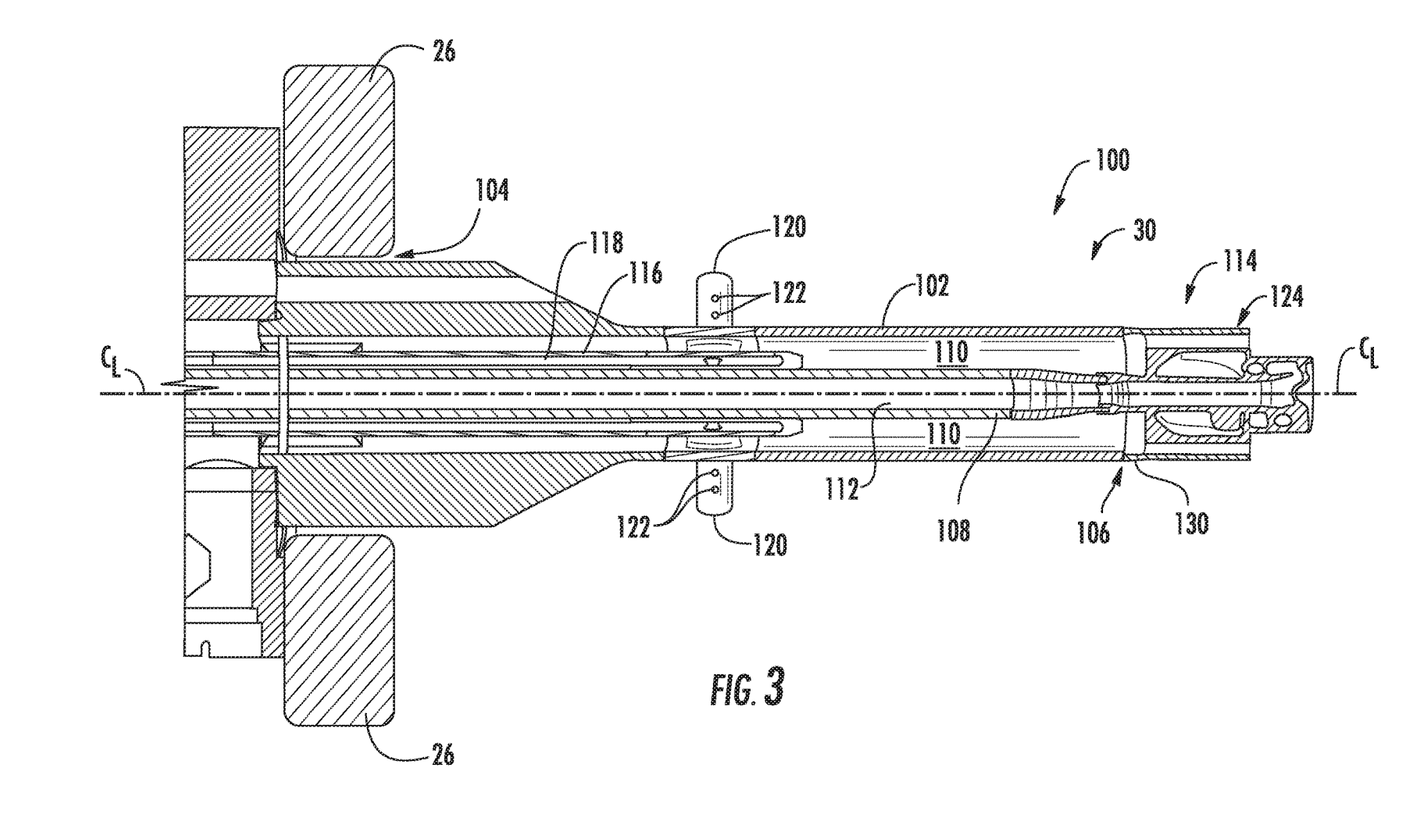
FIG. 3 is a cross sectional side view of an exemplary fuel nozzle or fuel nozzle assembly as may be used in the combustor as shown in FIG. 2, according to at least one embodiment of the present disclosure.

FIG. 3 provides a cross sectional side view of an exemplary fuel nozzle or fuel nozzle assembly 100 as may be used for the secondary fuel nozzle 30 as shown in FIG. 2, according to at least one embodiment of the present disclosure. The fuel nozzle 100 may be connected to the end cover 26 or may be breach loaded through the end cover 26. In one embodiment, as shown in FIG. 3, the fuel nozzle 100 includes an outer tube 102 having an upstream end 104 that is axially spaced from a downstream end 106 with respect to an axial centerline of the fuel nozzle 100. An inner tube 108 extends axially within the outer tube 102 and may be coaxially aligned with the outer tube 102. The inner tube 108 is radially spaced from the outer tube 102 so as to define an annular air passage 110 therebetween. The annular air passage 110 may be in fluid communication with a compressed air source or air circuit defined within the end cover 26. The inner tube 108 defines a pilot fuel passage 112 within the outer tube 102. The inner tube 108 may be fluidly coupled to an external fuel supply (not shown).

In particular embodiments, the fuel nozzle 100 may include an intermediate tube 116 that extends axially within the outer tube 102 with respect to the axial centerline of the fuel nozzle 100. The intermediate tube 116 circumferentially surrounds at least a portion of the inner tube 108 and defines a secondary fuel passage 118 within the outer tube 102. A plurality of fuel pegs 120 may be circumferentially spaced about the outer tube 102. Each fuel peg 120 extends radially outwardly from the outer tube 102 with respect to the axial centerline of the fuel nozzle 100. One or more of the fuel pegs 120 may include one or more fuel injection orifices 122 which are in fluid communication with the secondary fuel passage 118.

Figure 4:
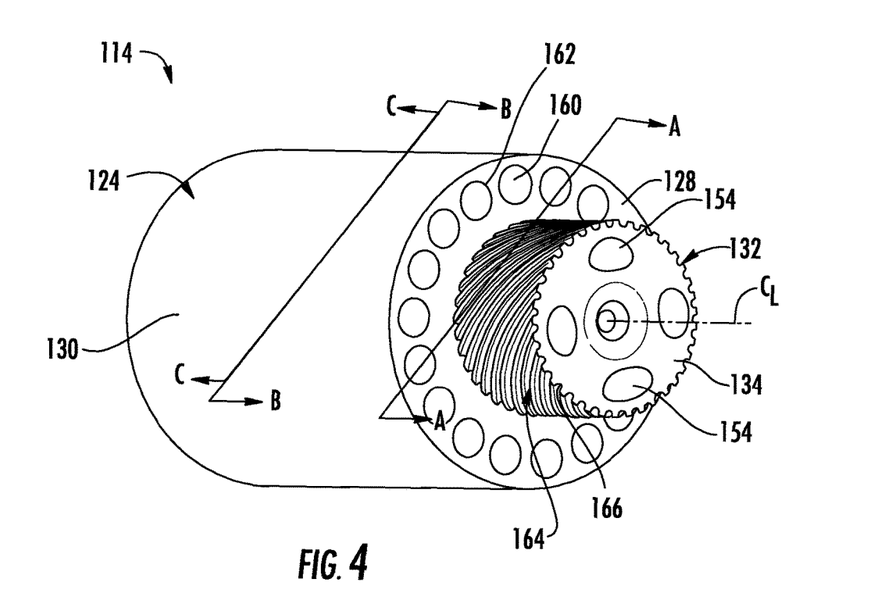
FIG. 4 is a perspective view of a premix pilot nozzle of the fuel nozzle assembly as shown in FIG. 3, according to at least one embodiment of the present disclosure.
Figure 5:
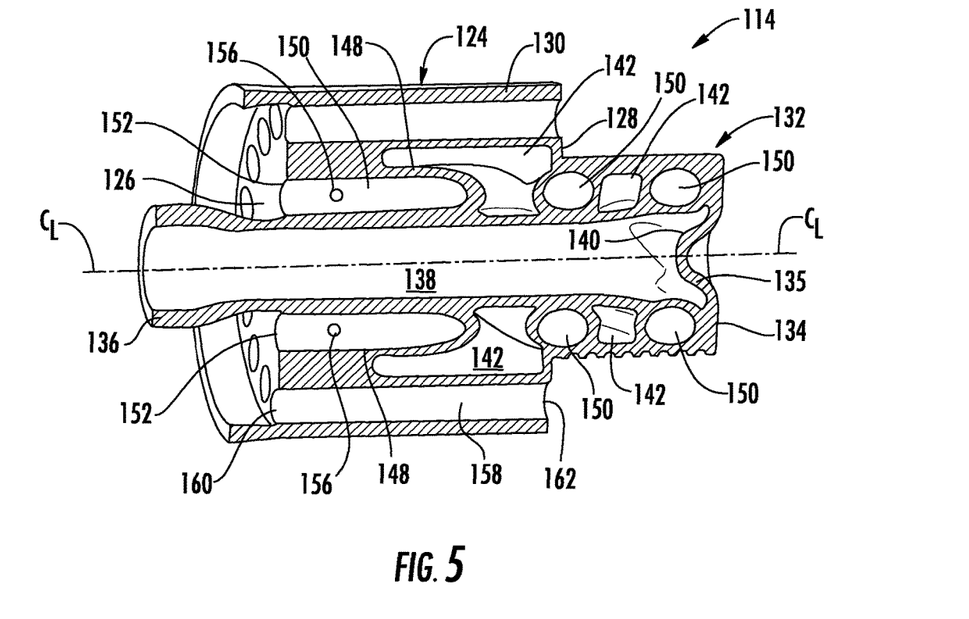
FIG. 5 is a perspective cross sectional view of the premix pilot nozzle as shown in FIG. 4, according to at least one embodiment of the present disclosure.

In at least one embodiment, the premix pilot nozzle 114 includes a nozzle body 124. FIG. 4 provides a perspective view of the premix pilot nozzle 114 according to at least one embodiment of the present disclosure. FIG. 5 provides a perspective cross sectional view of the premix pilot nozzle 114 as shown in FIG. 3. As shown collectively in FIGS. 4 and 5, the nozzle body 124 includes a forward wall 126 that is axially spaced from an aft wall 128 with respect to an axial centerline of the nozzle body 124 and an outer band 130 that extends axially between the forward wall 126 and the aft wall 128. The outer band 130 defines a radially outer perimeter of the nozzle body 124. As shown in FIG. 3, the outer band 130 may be coupled or connected to the downstream end 106 of the outer tube 102.

As shown collectively in FIGS. 4 and 5, the nozzle body 124 further includes a tip portion 132. The tip portion 132 extends axially downstream from the aft wall 128 with respect to an axial centerline of the nozzle body 124 and includes a downstream wall 134. In particular embodiments, the tip portion 132 of the nozzle body 124 may be cylindrical but is not limited to any particular shape unless otherwise recited in the claims.

As shown in FIG. 5, the nozzle body 124 further defines or includes a fuel tube or inner wall 136 that extends coaxially within the nozzle body 124 with respect to the axial centerline of the nozzle body 124. The fuel tube 136 defines a fuel inlet plenum 138 within the nozzle body 124. The fuel inlet plenum 138 extends coaxially within the nozzle body 124 and is partially defined by an inner surface or wall 140 of the downstream wall 134 of the tip portion 132. As shown in FIG. 3, the fuel tube 136 is connected to the inner tube 108 such that the fuel inlet plenum 138 is in fluid communication with the pilot fuel passage 112 of the inner tube 108.

Figures 6, 7:
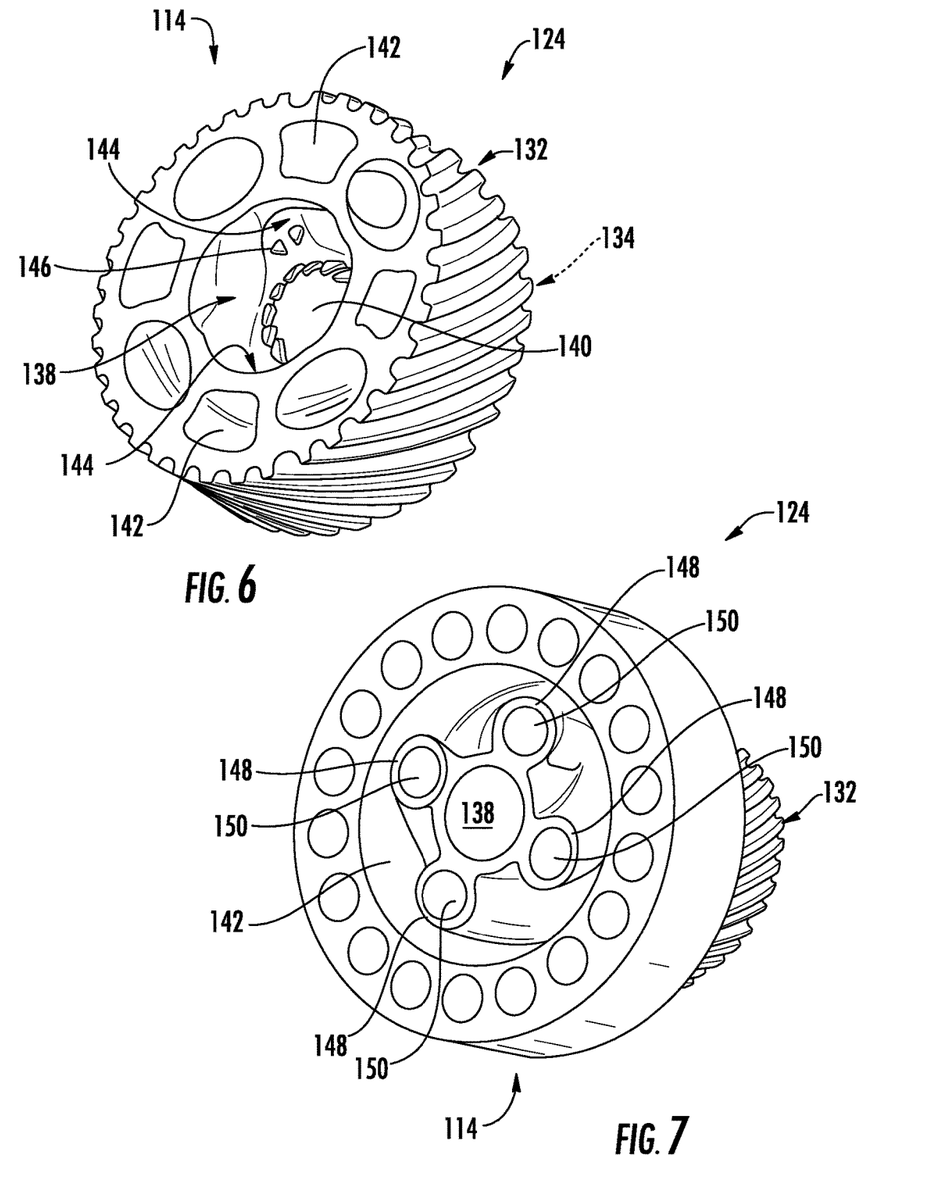
FIG. 6 is a cross sectioned perspective view of a portion of the tip portion of the premix pilot nozzle as taken along section lines A-A as shown in FIG. 4, according to at least one embodiment of the present disclosure.
FIG. 7 is a cross sectioned perspective view of a portion of the premix pilot nozzle as taken along section lines B-B as shown in FIG. 4, according to at least one embodiment of the present disclosure.
Figure 8:
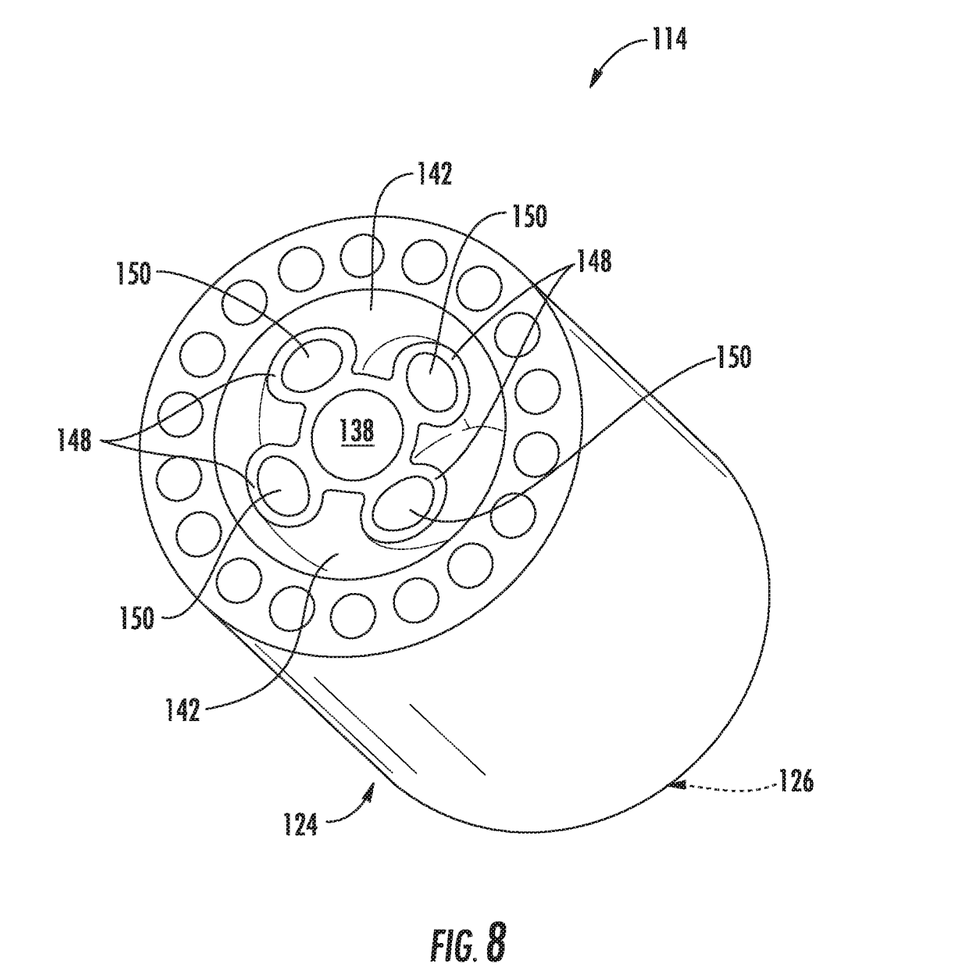
FIG. 8 provides a cross sectioned perspective view of a portion of the premix pilot nozzle as taken along section lines C-C as shown in FIG. 4, according to at least one embodiment of the present disclosure.

As shown in FIG. 5, the nozzle body 124 further includes a fuel distribution plenum or void 142 which is defined inside or within the nozzle body 124. The fuel distribution plenum 142 is defined radially outwardly from the fuel tube 136 and as such from the fuel inlet plenum 138 and is separated from the fuel inlet plenum 138 via the fuel tube 136. FIG. 6 provides a cross sectioned perspective view of a portion of the tip portion 132 of the premix pilot nozzle 114 as taken along section lines A-A as shown in FIG. 4. FIG. 7 provides a cross sectioned perspective view of a portion of the premix pilot nozzle 114 as taken along section lines B-B as shown in FIG. 4. FIG. 8 provides a cross sectioned perspective view of a portion of the premix pilot nozzle 114 as taken along section lines C-C as shown in FIG. 4.

As shown most clearly in FIG. 6, the fuel inlet plenum 138 is in fluid communication with the fuel distribution plenum 142 via a plurality of orifices or openings 144 which are circumferentially spaced about the axial centerline of the nozzle body 124 with respect to the axial centerline of the nozzle body 124. The orifices 144 are defined proximate to or adjacent to the inner surface 140 of the downstream wall 134. In one or more embodiments, as shown in FIG. 6, the inner surface 140 of the downstream wall 134 includes a plurality of heat transfer features 146 which protrude outwardly from the inner surface 140 of the downstream wall 134 within the fuel inlet plenum 138. In one embodiment, the heat transfer features 146 comprise a plurality of pins or pin fins. At least some of the heat transfer features 146 may be positioned within or proximate to the orifices 144.

As shown in FIG. 5, the nozzle body 124 includes a plurality of premix tubes 148 disposed radially outwardly from the fuel tube 136 and/or from the fuel inlet plenum 138. Each premix tube 148 defines a respective premix passage 150 through the nozzle body 124. As shown in FIGS. 7 and 8 collectively, the plurality of premix tubes 148 and as such to the respective premix passages 150 extend helically around the fuel tube 136 and/or the fuel inlet plenum 138 within the fuel distribution plenum 142 with respect to the axial centerline of the nozzle body 124.

As shown in FIGS. 4 and 5 collectively, each premix tube 148 and as such each premix passage 150 includes a respective inlet 152 (FIG. 5) defined along the forward wall 126 and a respective outlet 154 (FIG. 4) defined along the downstream wall 134 of the tip portion 132. As shown in FIG. 5, the respective inlets 152 are circumferentially spaced along the forward wall 126 and annularly arranged about the axial centerline of the nozzle body 124. As shown in FIG. 4, the respective outlets 154 are circumferentially spaced along the downstream wall 134 and annularly arranged about the axial centerline of the nozzle body 124. As shown in FIG. 5, each premix tube 148 and as such each premix passage 150 may be in fluid communication with the fuel distribution plenum 142 via one or more fuel ports 156 defined along each respective premix tube 148.

As shown in FIGS. 4 and 5 collectively, the fuel nozzle assembly 100 includes a plurality of air passages 158 annularly arranged around and disposed radially outwardly from the plurality of premix tubes 148 and as such annularly arranged the premix passages 150 with respect to the axial centerline of the nozzle body 124. In particular embodiments, the plurality of air passages 158 may be defined by the nozzle body 124 and/or may be part of the premix pilot nozzle 114. Each air passage 158 of the plurality of air passages 158 comprises a respective inlet 160 which is defined along the forward wall 126 and respective outlet 162 which is defined along the aft wall 128 of the nozzle body 124.

In particular embodiments, as shown in FIGS. 4 and 5, a portion 135 of the downstream wall 134 of the tip portion 132 which is defined radially inwardly from the respective outlets 154 of the premix passages 150 is dimpled or concaved inwardly along the axial centerline of the nozzle body 124 towards the forward wall 126. In particular embodiments as shown in FIG. 4, a radially outer surface 164 of the tip portion 132 of the nozzle body 124 includes a plurality of grooves 166 that extend helically along the outer surface 164 about the axial centerline of the nozzle body 124 between the aft wall 128 and the downstream wall 134 of the nozzle body 124.

In at least one embodiment, the nozzle body 124 is formed as a singular body. In other words, the forward wall 126, the aft wall 128, the outer band 130, the tip portion 132, the fuel tube 136, the premix tubes 148 and the air passages 158 may all be formed as a singular body. For example, in particular embodiments, the nozzle body 124 is formed via an additive manufacturing process. The terms additive manufacturing or additively manufactured as used herein refers to any process which results in a useful, three-dimensional object and includes a step of sequentially forming the shape of the object one layer at a time. Additive manufacturing processes may include three-dimensional printing (3DP) processes, laser-net-shape manufacturing, direct metal laser sintering (DMLS), direct metal laser melting (DMLM), plasma transferred arc, freeform fabrication, etc.

During operation of the premix pilot nozzle 114, air flows from the annular air passage 110 defined between the inner tube 108 and the outer tube 102 and through the plurality of air passages 158 and through the respective premix passages 150. Fuel flows through the pilot fuel passage 112 and into the fuel inlet plenum 138 via the inner tube 108 and the fuel tube 136. The fuel flows across the inner surface 140 of the downstream wall 134 and into the fuel distribution plenum 142 via the plurality of orifices 144. The relatively cool fuel provides cooling to the downstream wall 134, thereby enhancing the mechanical life of the premix pilot nozzle 114. In particular embodiments, the heat transfer features 146, such as the pins, provide for enhanced heat transfer between the downstream wall 134 and the fuel. In particular embodiments, the dimpled portion 135 of the downstream wall 134 may also serve to reduce the operating temperature of the downstream wall 134. The fuel then flows from the fuel distribution plenum 142 and into the respective premix passages 150 via the respective fuel ports 156. The fuel and air mix within the respective premix passages 150 before being injected into the downstream combustion chamber 36 for combustion.

The premix pilot nozzle 114 as shown and described herein, may replace known high temperature and high Emissions diffusion type pilot nozzles which stabilize the flame in the downstream combustion chamber 36 at high temperature but at the expense of emissions. The premix pilot nozzle 114 as shown and described herein may replace known diffusion type premix pilot nozzles with a swirl stabilized premixed pilot nozzle. The premixed pilot nozzle 114 may result in more desirable emissions levels with the same flame stability provided by known diffusion type pilot nozzles while also providing improved dynamics and/or lean blow out limits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A premix pilot nozzle, comprising:
a nozzle body having a forward wall axially spaced from an aft wall, an outer band that extends between the forward wall and the aft wall, a tip portion extending axially downstream from the aft wall wherein the tip portion terminates at a downstream wall, a fuel inlet plenum that extends coaxially within the nozzle body and that is partially defined by an inner surface of the downstream wall and a fuel tube that extends axially within the nozzle body and the tip portion, a fuel distribution plenum defined within the nozzle body radially outwardly from and in fluid communication with the fuel inlet plenum, a plurality of premix passages extending helically around the fuel inlet plenum within the fuel distribution plenum, the plurality of premix passages defined within a plurality of helical premix tubes, wherein the fuel tube and the plurality of helical premix tubes are formed as a singular body; and
a plurality of air passages annularly arranged around the plurality of premix passages, wherein one or more premix passages of the plurality of premix passages is in fluid communication with the fuel distribution plenum.

2. The premix pilot nozzle as in claim 1, wherein each air passage of the plurality of air passages comprises a respective inlet defined along the forward wall and respective outlet defined along the aft wall of the nozzle body.

3. The premix pilot nozzle as in claim 1, wherein each premix passage of the plurality of premix passages comprises a respective inlet defined along the forward wall and a respective outlet defined along the downstream wall of the tip portion of the nozzle body.

4. The premix pilot nozzle as in claim 3, wherein a portion of the downstream wall defined radially inwardly from the respective outlets of the premix passages is dimpled inwardly along an axial centerline of the nozzle body towards the forward wall.

5. The premix pilot nozzle as in claim 1, wherein the nozzle body includes a plurality of pins protruding outwardly from the inner surface of the downstream wall within the fuel inlet plenum.

6. The premix pilot nozzle as in claim 1, wherein a radially outer surface of the tip portion of the nozzle body includes a plurality of grooves that extend between the aft wall and the downstream wall of the nozzle body.

7. The premix pilot nozzle as in claim 1, wherein a radially outer surface of the tip portion of the nozzle body includes a plurality of grooves that extend helically along the outer surface between the aft wall and the downstream wall of the nozzle body.

8. The premix pilot nozzle as in claim 1, wherein the tip portion of the nozzle body is cylindrical.

9. The premix pilot nozzle as in claim 1, wherein each premix passage includes a respective fuel port in fluid communication with the fuel distribution plenum.

10. A fuel nozzle, comprising:
an outer tube having an upstream end axially spaced from a downstream end;
an inner tube extending axially within the outer tube, wherein the inner tube is radially spaced from the outer tube so as to define an annular air passage therebetween; and
a premix pilot nozzle coupled to the downstream end of the outer tube, the premix pilot nozzle comprising:
a nozzle body having a forward wall axially spaced from an aft wall, an outer band coupled to the downstream end of the outer tube, the outer band extending axially between the forward wall and the aft wall, a tip portion extending axially downstream from the aft wall wherein the tip portion includes a downstream wall, a fuel tube that extends axially within the nozzle body and the tip portion, a fuel inlet plenum that extends coaxially within the nozzle body and that is defined by the fuel tube and partially defined by an inner surface of the downstream wall wherein the fuel inlet plenum is in fluid communication with the inner tube, a fuel distribution plenum defined within the nozzle body radially outwardly from and in fluid communication with the fuel inlet plenum and a plurality of premix passages extending helically around the fuel inlet plenum within the fuel distribution plenum, the plurality of premix passages defined within a plurality of helical premix tubes, wherein the fuel tube and the plurality of helical premix tubes are formed as a singular body; and a plurality of air passages annularly arranged around the plurality of premix passages, wherein each premix passage of the plurality of premix passages is in fluid communication with the fuel distribution plenum.

11. The fuel nozzle as in claim 10, wherein each air passage of the plurality of air passages comprises a respective inlet defined along the forward wall and respective outlet defined along the aft wall of the nozzle body.

12. The fuel nozzle as in claim 10, wherein each premix passage of the plurality of premix passages comprises a respective inlet defined along the forward wall and a respective outlet defined along the downstream wall of the tip portion of the nozzle body.

13. The fuel nozzle as in claim 12, wherein a portion of the downstream wall defined radially inwardly from the respective outlets of the premix passages is dimpled inwardly along an axial centerline of the nozzle body towards the forward wall.

14. The fuel nozzle as in claim 10, wherein the nozzle body includes a plurality of pins protruding outwardly from the inner surface of the downstream wall within the fuel inlet plenum.

15. The fuel nozzle as in claim 10, wherein a radially outer surface of the tip portion of the nozzle body includes a plurality of grooves that extend between the aft wall and the downstream wall of the nozzle body.

16. The fuel nozzle as in claim 10, wherein a radially outer surface of the tip portion of the nozzle body includes a plurality of grooves that extend helically along the outer surface between the aft wall and the downstream wall of the nozzle body.

17. The fuel nozzle as in claim 10, wherein the tip portion of the nozzle body is cylindrical.

18. The fuel nozzle as in claim 10, wherein each premix passage includes a respective fuel port in fluid communication with the fuel distribution plenum.

19. The fuel nozzle as in claim 10, further comprising a plurality of fuel pegs circumferentially spaced about and extending radially outwardly from the outer tube.

20. The fuel nozzle as in claim 10, wherein the fuel nozzle is mounted to an end cover of a combustor of a gas turbine, wherein the combustor includes a plurality of primary fuel nozzles circumferentially spaced around the fuel nozzle.

* * * * *